United States Patent
Certain et al.

(10) Patent No.: US 10,358,232 B2
(45) Date of Patent: Jul. 23, 2019

(54) DETECTING THAT A ROTORCRAFT IS APPROACHING A VORTEX DOMAIN, AND SIGNALING THAT DETECTION

(71) Applicant: AIRBUS HELICOPTERS, Marignane (FR)

(72) Inventors: Nicolas Certain, Aix en Provence (FR); Lionel Pignier, Vitrolles (FR)

(73) Assignee: AIRBUS HELICOPTERS, Marignane (FR)

( * ) Notice: Subject to any disclaimer, the term of this patent is extended or adjusted under 35 U.S.C. 154(b) by 95 days.

(21) Appl. No.: 15/633,925

(22) Filed: Jun. 27, 2017

(65) Prior Publication Data
US 2017/0369181 A1    Dec. 28, 2017

(30) Foreign Application Priority Data

Jun. 28, 2016    (FR) ...................................... 16 01020

(51) Int. Cl.
| | | |
|---|---|---|
| *B64C 27/00* | (2006.01) | |
| *B64C 27/04* | (2006.01) | |
| *B64D 45/00* | (2006.01) | |

(52) U.S. Cl.
CPC ............ *B64D 45/00* (2013.01); *B64C 27/006* (2013.01); *B64C 27/04* (2013.01)

(58) Field of Classification Search
CPC ........ B64D 45/00; B64C 27/006; B64C 27/04
See application file for complete search history.

(56) References Cited

U.S. PATENT DOCUMENTS

| | | | |
|---|---|---|---|
| 7,907,066 B2 | 3/2011 | Certain | |
| 7,941,250 B2 | 5/2011 | Certain | |
| 8,843,252 B2 | 9/2014 | Eglin | |
| 2009/0089006 A1* | 4/2009 | Certain | ................ B64C 27/006 702/144 |

(Continued)

FOREIGN PATENT DOCUMENTS

| | | |
|---|---|---|
| EP | 1950718 | 7/2008 |
| FR | 2921635 | 4/2009 |
| FR | 2921728 | 4/2009 |

(Continued)

OTHER PUBLICATIONS

French Search Report for French Application No. FR 1601020, Completed by the French Patent Office, dated Feb. 28, 2017, 8 Pages.

*Primary Examiner* — James J Yang
*Assistant Examiner* — Kevin Lau
(74) *Attorney, Agent, or Firm* — Brooks Kushman P.C.

(57) ABSTRACT

A method and a device for detecting that a rotorcraft is approaching a vortex domain. After previously determining a limit advance speed threshold and a limit vertical speed threshold defining a limit for said rotorcraft entering into a vortex domain, a predictive advance speed and a predictive vertical speed for said rotorcraft are calculated, said predictive vertical speed being calculated differently depending on the value of said instantaneous advance speed. Thereafter, said predictive advance speed and said predictive vertical speed are compared with said thresholds, which may be thresholds with hysteresis, in order to determine whether said rotorcraft is approaching a vortex domain, and if so to signal this situation to a pilot of said rotorcraft.

21 Claims, 2 Drawing Sheets

(56) References Cited

U.S. PATENT DOCUMENTS

2011/0295568 A1   12/2011   Van Der Wall

FOREIGN PATENT DOCUMENTS

| FR | 2978586 |    | 2/2013  |
|----|---------|----|---------|
| RU | 2486596 | C1 * | 6/2013 |
| WO | 2004101358 | A2 | 11/2004 |
| WO | 2004101358 | A3 | 11/2004 |
| WO | 2011100179 |    | 8/2011  |

* cited by examiner

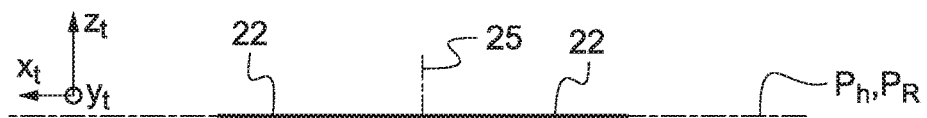
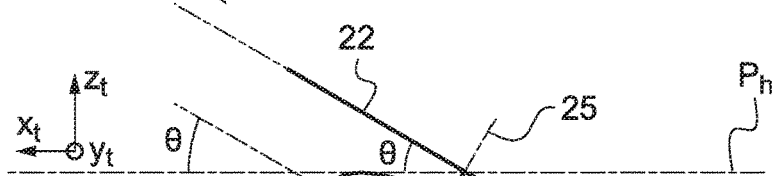
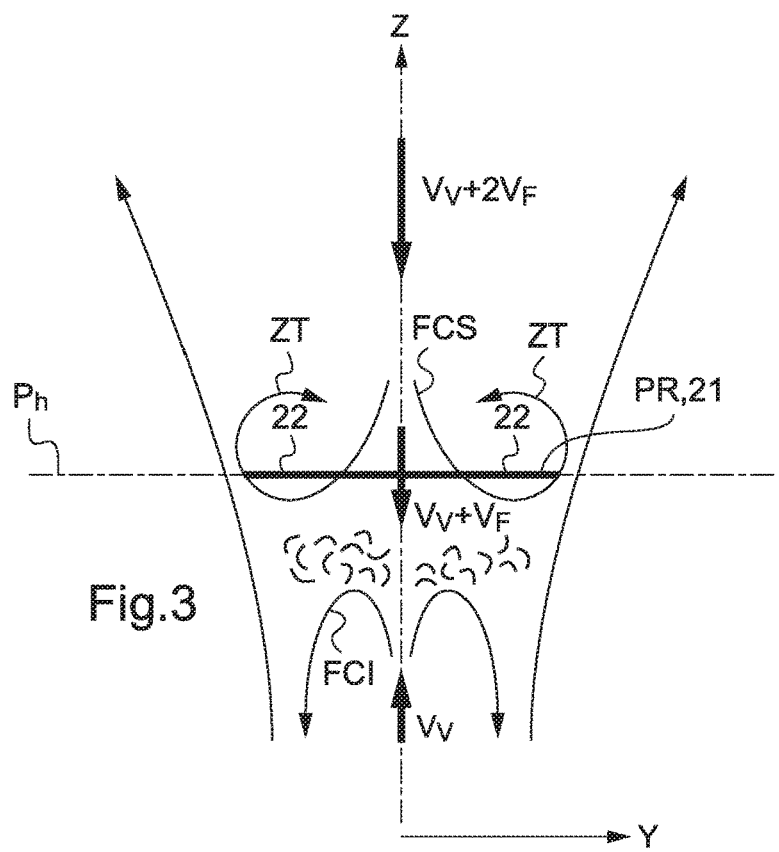

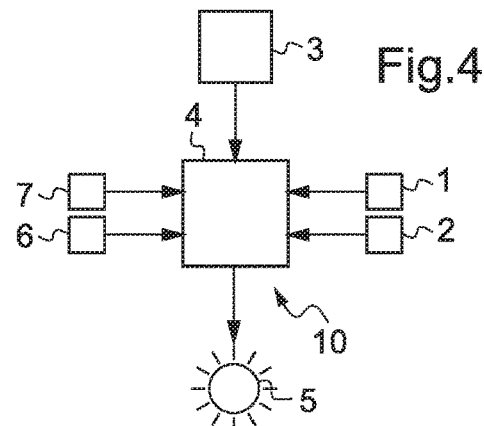
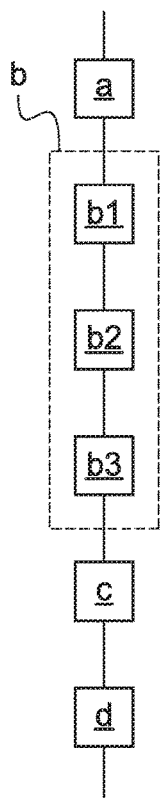
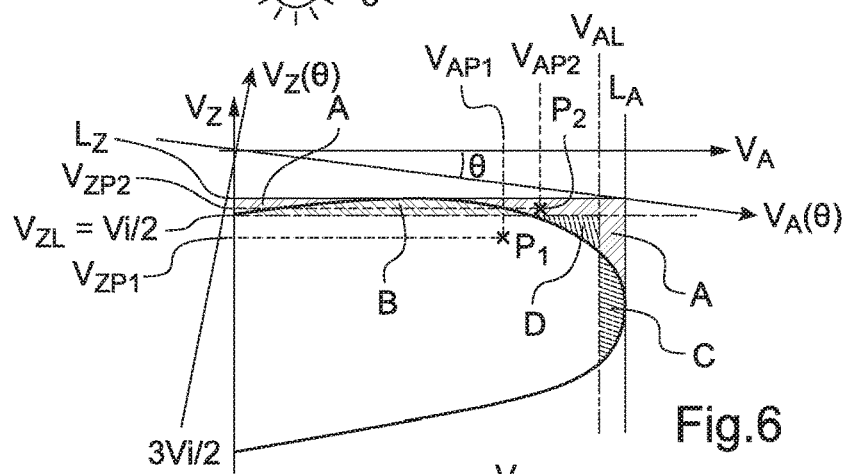
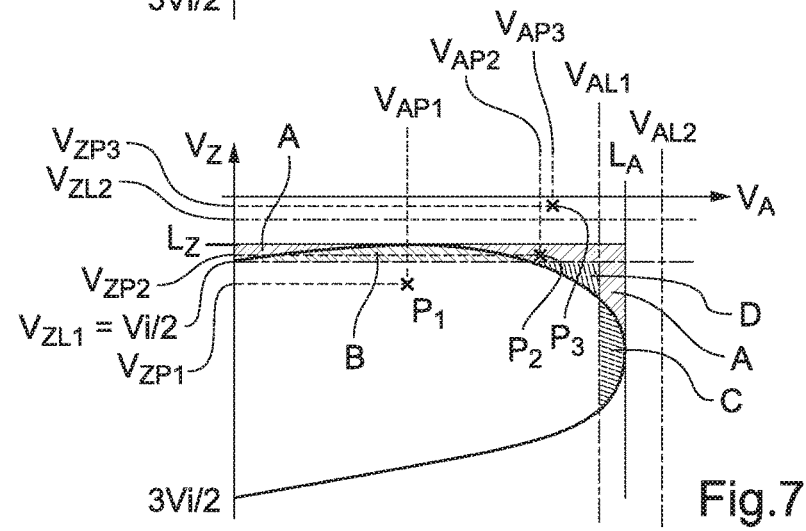
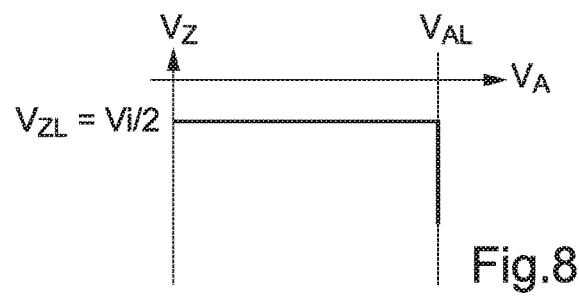

DETECTING THAT A ROTORCRAFT IS APPROACHING A VORTEX DOMAIN, AND SIGNALING THAT DETECTION

CROSS-REFERENCE TO RELATED APPLICATIONS

This application claims priority to French patent application No. FR 16 01020 filed on Jun. 28, 2016, the disclosure of which is incorporated in its entirety by reference herein.

BACKGROUND OF THE INVENTION (1) Field of the Invention

The present invention relates to the field of assisting piloting a rotorcraft, and in particular for stages of flight close to hovering or at a low advance speed during an approach. The present invention relates to a method and to a device for detecting that a rotorcraft, in particular a rotorcraft of the helicopter type, is approaching the vortex domain, and for signaling that detection.

More particularly, this method and device for detecting and signaling are intended to warn the pilot of a rotorcraft that it is close to, or even entering, a region of its flight envelope that is generally referred to by the person skilled in the art as the "vortex state".

(2) Description of Related Art

A rotorcraft, also known as a "rotary-wing aircraft", has at least one main rotor with a substantially vertical axis providing the aircraft at least with lift. The main rotor has blades driven to move in rotation. In the particular circumstance of a helicopter, the main rotor, as driven by at least one engine, provides both lift and propulsion. As a general rule, a helicopter also has an auxiliary anti-torque rotor for controlling the yaw movement of the rotorcraft.

Consequently, at least one engine delivers mechanical power to the main and auxiliary rotors, and also to other equipment via a main power transmission gearbox (MGB).

Under such conditions and ignoring particular stages of takeoff and landing and of turning, a rotorcraft performs three kinds of flight in principle:

vertical flight, upwards or downwards;
hovering flight, with the rotorcraft remaining stationary; and
flight in horizontal translation.

The invention relates to downward or "descending" flight, mainly during stages of approach for the purpose of landing, and also while approaching hovering flight.

Specifically, during descending flight, the flow of air generated by the main rotor differs depending on whether descent is fast, moderate, or slow.

Fast and moderate descending flight generally comprises regimes that are not motor-driven. The necessary power is provided by the stream of air and a freewheel interposed in the mechanical power transmission system allows the main rotor to turn freely.

In contrast, slow descending flight is a motor-driven regime, with the pilot causing the rotorcraft to descend and controlling that descent by varying the collective pitch of the blades of the main rotor.

The invention relates more specifically to slow descending flight of a rotorcraft, e.g. from a hovering position, this descent possibly taking place purely vertically or else along with a steeply sloping flight path, i.e. with a small horizontal speed component referred to herein as the "instantaneous proper speed" $V_P$ of the rotorcraft. This instantaneous proper speed $V_P$ remains in a relatively small range of values and is associated with an instantaneous vertical speed.

During a slow descending flight, a wake forms from the bottom portion of the main rotor, thereby obliging the bottom central air streams to be deflected downwards and the top central air streams to create a zone of turbulence towards the periphery of the blades. Aerodynamic flow is then disturbed and peripheral vortices run the risk of developing and completely isolating the plane of the main rotor. This dangerous phenomenon, referred to as the "vortex state" leads to a general loss of lift and controllability for the rotorcraft.

Under such conditions, when a rotorcraft in hovering flight begins a vertical descent, the reversal of the direction of speeds runs the risk of preventing the air stream from passing through the main rotor whether upwards or downwards. The blades are then working in their own wash and the air forms a turbulent ring around the main rotor. This vortex state gives rise to vibration that is dangerous for all rotorcraft and runs the risk of leading to a loss of control.

As a general rule, the turbulent ring develops at a vertical speed that is equal to about half the mean induced speed during hovering flight outside the ground effect zone and with an advance speed that is small or substantially zero. A large portion of the main rotor is then in a stall zone, with the various elements of the blade then operating with an angle of incidence that is relatively large. When the rotorcraft is moving in translation, the wash from the main rotor is deflected rearwards, and as a result the vortex state does not occur.

The vortex state is to be feared since the rotorcraft becomes isolated from the mass of air in which it is flying. The vertical speed indicator can then reach large undesired values. It takes a considerable amount of time to leave a vortex state. The three main ways of entering into a vortex state are as follows:

hovering flight with uncontrolled drift of vertical speed;
approach stages for the purpose of landing where the vertical speed for potentially entering into a vortex state is displayed with a uncontrolled reduction in the advance speed and/or with the collective pitch of the blades of the main rotor being raised too late, and thus with flight power being raised too late; and
uncontrolled stages of slowing down for the purpose of performing hovering flight, e.g. in order to perform winching or as a result of poor weather conditions with the collective pitch of the blades of the main rotor being raised too late.

In most circumstances, a vortex state is entered into at low altitude, and as a result the vertical speed of the rotorcraft and also the time required to leave this vortex state generally lead to the rotorcraft crashing. A vortex state is in some ways equivalent to stalling as observed with airplanes.

One known situation for entering the vortex state is during "quasi-vertical descent". The person skilled in the art qualifies such a vortex domain as "static". The attitude of the plane of the main rotor and the longitudinal attitude of the rotorcraft are both considered as being substantially zero.

Although this situation does indeed occur, it is not the situation that occurs the most frequently, since it does not correspond to a conventional way of using a rotorcraft.

The person skilled in the art also refers to a "dynamic" vortex domain, corresponding to the presence of the advance speed of the rotorcraft decelerating strongly. This dynamic vortex domain is characterized by an attitude angle θ for the plane of the main rotor relative to a plane normal to the gravity direction, i.e. associated with a terrestrial reference frame, that is of the order of 20°, or even more, for example. This angle of inclination of the plane of the main rotor is the result of a pilot of the rotorcraft acting on the cyclic stick controlling the longitudinal cyclic pitch of the blades of the main rotor, and it is accompanied by a variation in the longitudinal attitude θ of the rotorcraft, which substantially follows the angle of inclination of the plane of the main rotor.

This dynamic vortex domain is just as dangerous as the static vortex domain and, by way of example, it can occur when landing with a vertical descent speed and a large amount of horizontal deceleration, which situation can sometimes be made worse by a light tail wind.

As a result, a static vortex domain is defined essentially by a single vortex state such that the attitude of the plane of the main rotor is substantially zero. In contrast, there may be a plurality of dynamic vortex states. Each dynamic vortex state corresponds to a given attitude of the plane of the main rotor.

A vortex domain is thus dangerous, but it can be abandoned by the pilot initiating movement in translation by modifying the cyclic pitch of the blades of the main rotor. The technique recommended in some works for escaping the vortex domain, whereby the downward vertical speed of the rotorcraft is increased by reducing the collective pitch of the blades of the main rotor so that the main rotor escapes from its own wake, is indeed possible, however it is not realistic in operational situations where the height of the rotorcraft above the ground is low when the vortex state appears.

The technique that is recommended in operation for escaping from the vortex state is thus to increase the longitudinal cyclic pitch in a forward direction.

In order to anticipate the risk of the rotorcraft entering into a vortex domain, warning methods and systems exist for the purpose of alerting the pilot of a rotorcraft that flight is close to a vortex domain or is indeed already in a vortex domain.

For example, Document EP 1 950 718 describes such a system and such a method, in which a warning is triggered when firstly the tail wind speed to which the rotorcraft is subjected is greater than a first threshold determined as a function of the height of the rotorcraft relative to the ground, and secondly the descent speed of the rotorcraft is greater than a predefined second threshold. In addition, inhibition conditions serve to avoid issuing a warning when the rotorcraft is flying with a rate of change of heading or a rate of change of advance speed that is large. In contrast, that system and that method function only while the rotorcraft is flying with a tail wind.

Also known is Document FR 2 921 635, which describes a method and a device serving to detect that a rotorcraft is entering a vortex domain or indeed, in predictive manner, that the rotorcraft is approaching such a vortex domain. Such predictive detection is performed as a function of a predictive proper speed and a predictive vertical speed of the rotorcraft, which are determined in real time and possibly corrected.

Furthermore, Document EP 2 513 732 describes a system and a method serving to detect whether an aircraft is close to or indeed already in an aerodynamic stall situation, followed by engaging an automatic procedure for avoiding entering into a dangerous situation or else for escaping therefrom. Such a situation is detected by comparing a vertical speed error between the current vertical speed and the setpoint vertical speed with an error threshold and verifying its sign. The vertical acceleration and the advance speed of the aircraft can also be compared with respective thresholds in order to verify whether the aircraft has escaped from the stall situation.

Furthermore, Document US 2011/0295568 describes a method of determining changes in the geometry of the vortex state caused by the blades of the main rotor of the aircraft depending on the vertical induced speed of the main rotor and on the lift distribution of the blades of the main rotor.

Also known is Document FR 2 978 586, which describes a method and a device for assisting piloting for use in a hybrid aircraft having a main rotor and at least one propulsive propeller. That method makes it possible to define a minimum flight path angle that the aircraft can follow in descent as a function of a thrust margin for each propulsive propeller. That minimum angle may be used in particular in order to avoid the hybrid aircraft entering into a vortex domain.

Finally, Document WO 2004/101358 describes a flight control system for a rotorcraft that makes it possible to avoid a vortex state appearing. That flight control system acts on the collective and/or cyclic pitch of the blades of each main rotor, e.g. in oscillatory manner, so as to generate disturbances on its blades and thus avoid the appearance of the vortex state.

BRIEF SUMMARY OF THE INVENTION

An object of the present invention is to provide a method and a device making it possible to detect that the rotorcraft is approaching a vortex domain and to warn the pilot of this detection while avoiding the above-mentioned limitations. The system and the device of the invention operate in particular regardless of the wind conditions that apply to the flight of the rotorcraft. In addition, the system and the device of the invention also make it possible to detect that a rotorcraft is entering into a theoretical vortex domain.

The present invention makes such detection possible while the rotorcraft is decelerating, in particular during motor-driven descent flight and also when close to hovering flight, and it improves the detection, in particular at low advance speeds of the rotorcraft. The present invention can thus constitute an improvement of the detection method and the device described in Document FR 2 921 635.

The method of the invention for detecting and signaling that a rotorcraft is approaching a vortex domain is for a rotorcraft belonging to a family of rotorcraft and having a main rotor with blades. Such rotorcraft are conventionally classified in families as a function in particular of their weight and of the dimensions of their main rotors. This method comprises the following steps:

a) a preliminary step of determining a limit advance speed threshold and a limit vertical speed threshold defining a limit for entering into a vortex domain for the family of rotorcraft;

b) a calculation step of calculating in real time a predictive advance speed $V_{AP}$ and a predictive vertical speed $V_{ZP}$ of the rotorcraft during a flight of the rotorcraft;

the predictive advance speed $V_{AP}$ being calculated as a function of an instantaneous advance speed $V_A$ and of an instantaneous advance acceleration $$\frac{dV_A}{dt}$$

of the rotorcraft over a prediction time interval Δt characterizing the prediction time of the predictive advance speed $V_{AP}$ and of the predictive vertical speed $V_{ZP}$; and the predictive vertical speed $V_{ZP}$ being calculated on the basis of the instantaneous advance speed $V_A$, when the instantaneous advance speed $V_A$ is greater than an upper limit speed, the predictive vertical speed $V_{ZP}$ being calculated as a function of the instantaneous vertical speed $V_Z$ of the rotorcraft, of the energy balance of the rotorcraft, and of the power variation needed by the main rotor for level flight over the prediction time interval Δt; and when the instantaneous advance speed $V_A$ is less than a lower limit speed, the predictive vertical speed $V_{ZP}$ being calculated as a function of the instantaneous vertical speed $V_Z$ and of an instantaneous vertical acceleration $$\frac{dV_Z}{dt}$$

of the rotorcraft;

c) a step of triggering an alarm that a rotorcraft is approaching a vortex domain, the predictive advance speed $V_{AP}$ and the predictive vertical speed $V_{ZP}$ being compared respectively with the limit advance speed threshold and with the limit vertical speed threshold, the alarm being triggered when firstly the predictive advance speed $V_{AP}$ has reached the limit advance speed threshold, and secondly the predictive vertical speed $V_{ZP}$ has reached the limit vertical speed threshold; and d) a step of signaling the alarm to a pilot of the rotorcraft as a result of the triggering of the alarm.

A rotorcraft is characterized by three preferred directions, a longitudinal direction X extending from the rear of the rotorcraft towards the front of the rotorcraft, an elevation direction Z extending upwards perpendicularly to the longitudinal direction X, and a transverse direction Y extending from right to left perpendicularly to the longitudinal and elevation directions X and Z.

During the preliminary step, a series of prior measurements is taken on a reference rotorcraft for the family of the rotorcraft in question during preliminary test flights. A plurality of pairs of values relating to the tangential and normal components of the speed of the air flow relative to the plane of the main rotor of the reference rotorcraft are measured. These pairs of values make it possible to determine an instantaneous vortex domain representative of the vortex state by means of a diagram in which the abscissa and ordinate axes correspond respectively to said tangential and normal components.

A diagram representing a static vortex is thus defined for the reference rotorcraft, and consequently for the rotorcraft family of which this reference rotorcraft is a part.

The tangential and normal components of the air flow speed relative to the plane of the main rotor of this reference rotorcraft are preferably the instantaneous advance speed $V_A$ and the instantaneous vertical speed $V_Z$ of the reference rotorcraft.

Thereafter, a limit advance speed threshold and a limit vertical speed threshold are determined in order to define a limit for entering into a static vortex domain for this reference rotorcraft. These limit advance speed and limit vertical speed thresholds are determined from the diagram representing a static vortex for the rotorcraft family as determined during the preliminary step. This limit advance speed threshold and this limit vertical speed threshold may be generalized for all of the rotorcraft belonging to the rotorcraft family of this reference rotorcraft. These limit advance speed and limit vertical speed thresholds may for example be stored in storage means of the rotorcraft.

The step of calculating in real time a predictive advance speed $V_{AP}$ and a predictive vertical speed $V_{ZP}$ of the rotorcraft during a flight of the rotorcraft may include substeps in order to break down these calculations, the rotorcraft belonging to the same rotorcraft family as the reference rotorcraft that was used during the preliminary step.

This calculation step begins with a substep of determining the instantaneous advance speed $V_A$ and the instantaneous vertical speed $V_Z$ of the rotorcraft. These determinations are performed in real time, e.g. at each instant or else at regular time intervals.

The instantaneous vertical speed $V_Z$ of the rotorcraft is determined directly by means of first speed measurement means that may for example be a vertical speed indicator, a satellite positioning system such as the global positioning system (GPS), or indeed an inertial unit.

The instantaneous advance speed $V_A$ of the rotorcraft is determined by measuring a speed by using second speed measurement means, such as for example an airspeed indicator. An airspeed indicator provides a speed of the aircraft relative to air, known as the "calibrated airspeed $V_C$" or "observed speed" or indeed "indicated speed".

Furthermore, the airspeed indicator is a barometric instrument and its measurements may be corrected barometrically in known manner as a function of the relative density σ of the air, i.e. the quotient of the density ρ of the air at the altitude of the rotorcraft divided by the density $l_0$ of air at the ground in a standard atmosphere. Consequently, the instantaneous advance speed $V_A$ of the rotorcraft relative to the air corresponds preferably to the calibrated airspeed $V_C$ that has been barometrically corrected by the relationship $Vc = V_A \cdot \sqrt{\sigma}$. This calibrated speed $V_C$ as barometrically corrected is referred to as the instantaneous "proper" speed $V_P$ of the rotorcraft, or indeed the "true airspeed".

The predictive advance speed $V_{AP}$ of the rotorcraft then constitutes a predictive speed for the rotorcraft relative to air as corrected barometrically, and it may also be referred to as the "predictive proper speed $V_{PP}$" of the rotorcraft.

In addition, in the context of the invention, the instantaneous advance speed $V_A$ may be approximated by the calibrated airspeed $V_C$ which is then not corrected.

Likewise, the instantaneous advance speed $V_A$ may also be approximated by the horizontal component of the instantaneous proper speed $V_P$ of the rotorcraft. This horizontal component is a projection of the instantaneous proper speed $V_P$ onto a horizontal plane perpendicular to the gravity direction. The predictive advance speed $V_{AP}$ of the rotorcraft then constitutes a horizontal component of the predictive proper speed $V_{PP}$.

These approximations for the advance speed $V_A$ are possible because the method of the invention enables an approach to a vortex domain to be detected over a prediction time interval Δt and because of the predictive nature of the predictive advance speeds and vertical speed $V_{AP}$ and $V_{ZP}$ of the rotorcraft.

Such an approximation of the advance speed $V_A$ gives rise to an approximation about the prediction time interval Δt, but does not lead to a situation in which an approach to a vortex domain goes undetected.

Preferably, the airspeed indicator is bidirectional or multidirectional and provides airspeed measurements for the rotorcraft that are accurate, including at speeds that are low and down to zero speeds. For example, optical airspeed indicators are known such as light detection and ranging (LIDAR) indicators that enable the air speed of a rotorcraft to be measured by sequentially transmitting and receiving a LASER beam at a given frequency. There also exist ultrasound airspeed indicators that enable the air speed of a rotorcraft to be measured by transmitting and receiving ultrasound waves.

For such airspeed indicators, the air speed of the rotorcraft as measured may comprise a longitudinal component and a transverse component along the longitudinal and transverse directions X and Y of the rotorcraft.

In addition, an airspeed indicator can be monodirectional and provide measurements of the advance speed of the rotorcraft relative to air along only the longitudinal direction X of the rotorcraft.

The predictive advance speed $V_{AP}$ and the predictive vertical speed $V_{ZP}$ of the rotorcraft are then calculated in real time while the rotorcraft is in flight. The predictive advance speed $V_{AP}$ and the predictive vertical speed $V_{ZP}$ are evaluations of the advance speed $V_A$ and of the vertical speed $V_Z$ that the aircraft will reach at the end of the prediction time interval $\Delta t$. By way of example, this prediction time interval $\Delta t$ is 10 seconds (s). By way of example, the predictive advance speed $V_{AP}$ and the predictive vertical speed $V_{ZP}$ are stored in memory means of the rotorcraft.

The predictive advance speed $V_{AP}$ may be calculated during a first calculation substep as a function of the instantaneous advance speed $V_A$ and of an instantaneous advance acceleration $$\frac{dV_A}{dt}$$

of the rotorcraft over the prediction time interval $\Delta t$.

The predictive advance speed $V_{AP}$ is preferably calculated by a first relationship:

$$V_{AP} = V_A + \Delta t \cdot \frac{dV_A}{dt}$$

where t and $\Delta t$ are respectively time and the prediction time interval.

The predictive vertical speed $V_{ZP}$ may be calculated during a second calculation substep knowing the instantaneous advance speed $V_A$, which can define three situations.

In a first situation, when the instantaneous advance speed $V_A$ is greater than an upper limit speed, the predictive vertical speed $V_{ZP}$ is calculated as a function of an instantaneous vertical speed $V_Z$ of the rotorcraft, of the energy balance of the rotorcraft, and of variation in the level flight power of the main rotor over the prediction time interval $\Delta t$.

The term "energy balance" of the rotorcraft involves applying one or more equations or relationships for characterizing the energy stored and/or consumed by the rotorcraft in flight, e.g. by applying the principle of energy conservation during the flight of the rotorcraft.

The predictive vertical speed $V_{ZP}$ is thus calculated by a second relationship:

$$V_{ZP} = V_Z + A \cdot \left| V_A \cdot \frac{dV_A}{dt} \right| + B \cdot (V_Z + k) \cdot \frac{V_{AP} - V_A}{2 \cdot V_Y - V_{AP}}$$

where k is a constant characteristic of the rotorcraft family of the rotorcraft, A is a first weighting coefficient, B is a second weighting coefficient, and $V_Y$ is a predetermined minimum power speed of the rotorcraft family. The second weighting coefficient B may be a function of the predetermined minimum power speed $V_Y$, and it is preferably less than or equal to 1.

This second weighting coefficient B is determined by tests specific to each rotorcraft family. This second weighting coefficient B is generally close to unity. Nevertheless, the specific features of each rotorcraft can lead to a small difference from this general value, which difference is determined as a result of testing.

The characteristic constant k is defined in particular in Documents FR 2 921 635 and FR 2 921 728. This characteristic constant k is determined by testing, e.g. on a reference rotorcraft of the rotorcraft family, and by using a linear approximation that corresponds to a proportionality ratio between the powers of the rotorcraft and its instantaneous vertical speed $V_Z$, independently of the weight of the rotorcraft, such that:

$$V_Z = k \cdot \left( \frac{W}{W_n} - 1 \right)$$

using the approximation:

$$\frac{W_n}{W_{V_Y}} = 2 - \frac{V_A}{V_Y}$$

$W_{V_Y}$ and $W_n$ being the powers needed for the rotorcraft to perform level flight respectively at the minimum power speed $V_Y$ and at the instantaneous advance speed $V_A$, W being the instantaneous available power of the rotorcraft.

Thereafter, applying the principle of energy conservation during a deceleration of the rotorcraft to hovering flight is defined by the following expression:

$$m \cdot V_A \frac{dV_A}{dt} + m \cdot g \cdot \frac{dh}{dt} + W_n + W_{mot} = 0$$

m, h, and g respectively designating the mass of the rotorcraft, the height at which it is flying above the ground, and the acceleration due to gravity, $W_n$ and $W_{mot}$ being respectively the flight power needed for level flight of the rotorcraft at the instantaneous advance speed $V_A$, and the power delivered by the power plant of the rotorcraft.

The second relationship can be deduced therefrom in the manner described in Documents FR 2 921 635 and FR 2 921 728. In particular, the first weighting coefficient A is proportional to the ratio $$\frac{1}{g}$$

and is preferably less than 0.1. The value of this first weighting coefficient A may be refined during the preliminary testing. These weighting coefficients A and B are constants for a rotorcraft family.

Nevertheless, this second relationship differs from that described in Documents FR 2 921 635 and FR 2 921 728 in that it uses the absolute value function in application to the expression, $$\left| V_A \cdot \frac{dV_A}{dt} \right|$$

the first weighting coefficient A being negative. This use of the absolute value function advantageously makes it possible to determine a predictive vertical speed $V_{ZP}$ both when the rotorcraft is decelerating and when it is accelerating, the first weighting coefficient A being negative. This makes it possible to anticipate a reduction in the vertical speed $V_Z$ while the advance speed of the rotorcraft is accelerating.

Furthermore, the expression:

$$B \cdot (V_Z + k) \cdot \frac{V_{PP} - V_P}{2 \cdot V_Y - V_{PP}},$$

which represents the power variation in level flight of the main rotor over the prediction time interval $\Delta t$, is applicable for calculating the predictive vertical speed $V_{ZP}$ only when the rotorcraft is flying firstly at a low instantaneous advance speed $V_A$ less than the predetermined minimum power speed $V_Y$ of the rotorcraft family but still greater than the upper limit speed, and secondly with an instantaneous advance speed $V_A$ that is decreasing, characteristic of the rotorcraft decelerating.

In a second situation, when the instantaneous advance speed $V_A$ is less than a lower limit speed, the predictive vertical speed $V_{ZP}$ is calculated as a function of the instantaneous vertical speed $V_Z$ and of an instantaneous vertical acceleration $$\frac{dV_Z}{dt}$$

of the rotorcraft. The predictive vertical speed $V_{ZP}$ is preferably calculated using a third relationship:

$$V_{ZP} = V_Z + D \cdot \Delta t \cdot \frac{dV_Z}{dt}$$

where D is a third weighting coefficient. The third weighting coefficient D is less than or equal to 1. This third weighting coefficient D is determined by testing for each rotorcraft family.

In a third situation, when the instantaneous advance speed $V_A$ is less than or equal to the upper limit speed and is greater than or equal to the lower limit speed, two alternatives are possible.

In a first alternative, the predictive vertical speed $V_{ZP}$ is an interpolation, e.g. a linear interpolation, between the two preceding situations, i.e. between the second and third relationships.

In a second alternative, the predictive vertical speed $V_{ZP}$ is calculated using logic with hysteresis.

Thus, when the instantaneous advance speed $V_A$ decreases from the upper limit speed and remains greater than or equal to the lower limit speed, the predictive vertical speed $V_{ZP}$ is calculated as for the first situation, i.e. as a function of the instantaneous vertical speed $V_Z$, of the energy balance of the rotorcraft, and of the power variation needed by the main rotor for level flight over the prediction time interval $\Delta t$. The second relationship may be applied.

In contrast, when the instantaneous advance speed $V_A$ is increasing from the lower limit speed and remains less than or equal to the upper limit speed, the predictive vertical speed $V_{ZP}$ is calculated as for the second situation, i.e. as a function of the instantaneous vertical speed $V_Z$ and of an instantaneous vertical acceleration $$\frac{dV_Z}{dt}$$

of the rotorcraft. The third relationship may be applied.

The instantaneous advance acceleration $$\frac{dV_A}{dt}$$

and the instantaneous vertical acceleration $$\frac{dV_Z}{dt}$$

of the rotorcraft can be measured directly and respectively by measurement means dedicated for each type of acceleration. These accelerations can also be determined respectively by taking the derivative relative to time of the instantaneous advance speed $V_A$ and of the predictive vertical speed $V_{ZP}$.

By way of example, for a rotorcraft family corresponding to a weight lying in the range four to six (metric) tonnes, the characteristic constant k is equal to 4000 feet per minute (ft/min), the first weighting coefficient A is equal to –0.05, the second weighting coefficient B is equal to 1 when the advance speed $V_A$ is less than or equal to the predetermined minimum power speed $V_Y$ and zero when the advance speed $V_A$ is greater than the predetermined minimum power speed $V_Y$.

The third weighting coefficient D is equal to 0.5. By way of example, the predetermined minimum power speed $V_Y$ may be close to 65 knots (kt) for this family of rotorcraft. Finally, the lower limit speed is equal to 15 kt and the upper limit speed is equal to 35 kt, for example. This lower limit speed equal to 15 kt then corresponds to the limit for entering into hovering flight, the upper limit speed equal to 35 kt being used for introducing interpolation by smoothing or indeed a cycle with hysteresis.

Thereafter, during the step of triggering an alarm, the predictive advance speed $V_{AP}$ and the predictive vertical speed $V_{ZP}$ are initially compared respectively with a limit advance speed threshold and with a limit vertical speed threshold.

In a first variant of the invention, the limit advance speed threshold and the limit vertical speed threshold are simple thresholds respectively constituted by a limit advance speed and by a limit vertical speed. These limit advance speed and limit vertical speed thresholds are then constant.

Preferably, the limit vertical speed corresponds substantially to half a mean value for the speed of the air streams induced by the action of the main rotor of the rotorcraft when the rotorcraft is hovering outside the ground effect zone. Specifically, this induced speed is a function of the weight of the rotorcraft and of the density of the air. Taking a mean value of this induced speed makes it possible to cover all flight conditions and all the rotorcraft of the rotorcraft family.

By way of example, the limit advance speed is equal to 25 kt and the limit vertical speed is equal to −1200 ft/min for the rotorcraft family corresponding to a weight lying in the range four to six tonnes.

The alarm is then triggered when firstly the predictive advance speed $V_{AP}$ is less than or equal to the limit advance speed and secondly the predictive vertical speed $V_{ZP}$ is less than or equal to the limit vertical speed. The alarm is deactivated as soon as the predictive advance speed $V_{AP}$ is greater than the limit advance speed or as soon as the predictive vertical speed $V_{ZP}$ is greater than the limit vertical speed.

In a second variant of the invention, the advance speed threshold is a first threshold with hysteresis constituted by a first limit advance speed and by a second limit advance speed. The limit vertical speed threshold is a second threshold with hysteresis constituted by a first limit vertical speed and by a second limit vertical speed. The first limit advance speed is less than the second limit advance speed and the first limit vertical speed is less than the second limit vertical speed. The first limit vertical speed may correspond substantially to half a mean value of the speed of the air streams induced by the action of the main rotor of the rotorcraft when the rotorcraft is hovering outside the ground effect zone. Nevertheless, it is possible that it is the second limit vertical speed that corresponds substantially to half a mean value of this induced speed. For example, the first limit advance speed may be equal to 21 kt, the second limit advance speed may be equal to 26 kt, the first limit vertical speed may be equal to −1200 ft/min, and the second limit vertical speed may be equal to −800 ft/min.

The alarm is then triggered when firstly the predictive advance speed $V_{AP}$ is less than or equal to the first limit advance speed and secondly the predictive vertical speed $V_{ZP}$ is less than or equal to the first limit vertical speed. The alarm is deactivated as soon as the predictive advance speed $V_{AP}$ is greater than the second limit advance speed or as soon as the predictive vertical speed $V_{ZP}$ is greater than the second limit vertical speed.

In a third variant of the invention, the limit advance speed threshold and the limit vertical speed threshold are constituted by the curve for the vortex domain as determined at the end of the preliminary test flight on the reference rotorcraft of the rotorcraft family. The limit advance speed threshold and the limit vertical speed are then variables.

The alarm is then triggered when the predictive advance speed $V_{AP}$ and the predictive vertical speed $V_{ZP}$ form a predictive operating point for the rotorcraft that is situated on or indeed below the vortex domain curve, the alarm being deactivated as soon as the predictive advance speed $V_{AP}$ and the predictive vertical speed $V_{ZP}$ form a predictive operating point situated above the vortex domain curve.

In a fourth variant of the invention, the limit advance speed threshold and the limit vertical speed threshold are constituted by two curves forming a threshold with hysteresis. The two curves are preferably substantially parallel and determined as a function of the preliminary test flight of the reference rotorcraft for the rotorcraft family. The limit advance speed threshold and the limit vertical speed threshold are thus variable, as for the third variant.

A lower curve constitutes a first bound for this threshold with hysteresis and an upper curve constitutes a second bound for this threshold with hysteresis. Consequently, the alarm is triggered when the predictive advance speed $V_{AP}$ and the predictive vertical speed $V_{ZP}$ form a predictive operating point for the rotorcraft that is situated on or below the lower curve, the alarm being deactivated as soon as the predictive advance speed $V_{AP}$ and the predictive vertical speed $V_{ZP}$ form a predictive operating point situated above the upper curve.

Finally, during the signaling step, the alarm is signaled to a pilot of the rotorcraft as a result of the alarm being triggered. This alarm may be triggered to the pilot visually, e.g. by lighting a dedicated lamp or by displaying a specific message on an information screen. The alarm may also be signaled to the pilot audibly, e.g. by issuing a specific sound or a recorded message.

In addition, during the signaling step, time delays may be used between triggering the alarm and signaling to the pilot of the rotorcraft that the alarm has been triggered, and also between deactivating the alarm and signaling to the pilot that the alarm has been deactivated. These time delays serve to avoid signaling to the pilot untimely and successive triggerings and deactivations of the alarm. These time delays are particularly useful when using simple thresholds for the limit advance speed and for the limit vertical speed. The use of thresholds with hysteresis serves to limit any such risk of signaling to the pilot untimely and successive triggerings and deactivations of the alarm.

Nevertheless, it is possible to combine the use of thresholds with hysteresis and of time delays so as to manage the signaling of the alarm being triggered and deactivated as well as possible.

For example, the triggering of the alarm may be signaled to the pilot 1 s after the alarm has been triggered, and the deactivation of the alarm may be signaled to the pilot 3 s after the alarm has been deactivated.

Furthermore, the method of the invention may include an inhibit step of deactivating triggering of the alarm or of signaling that the alarm has been triggered. This inhibit step preferably deactivates signaling of the alarm and may for example be situated between the step of triggering an alarm and the signaling step.

A first inhibit condition may correspond for example to a rotorcraft operating at a height above the ground that is less than or equal to a limit height. This first inhibit condition characterizes a position of the rotorcraft that is close to the ground, e.g. corresponding to a stage of takeoff or landing. This position close to the ground may also correspond to an aborted landing stage.

A second inhibit condition corresponds to a rotorcraft that has at least two engines, that has entered into an emergency mode of operation as a result of one of the engines malfunctioning for a duration less than a predetermined duration.

These two inhibit conditions characterize particular or emergency stages of flight that monopolize all the attention of the pilot and of the copilot. Additionally signaling an alarm in a situation that is already complicated might disturb the pilot and/or the copilot in managing this situation without providing them with any additional assistance. It is therefore preferable not to signal an approach to a vortex domain to them at that time. Furthermore, when the rotorcraft is in a transient stage, e.g. as a result of losing an engine, that might explain why a vortex domain is being approached, but the pilot and/or the copilot of the rotorcraft then manage such a situation in order to return to a stable stage of flight and move away naturally from this vortex domain. Signaling to the pilot and/or to the copilot that they are approaching a vortex domain does not provide them with any assistance in this context and might, on the contrary, disturb them in carrying out the procedure that needs to be applied.

For example, the limit height lies in the range 20 ft to 100 ft and the predetermined duration may be equal to 30 s. These values are generally independent of the rotorcraft family. This duration of 30 s corresponds to the one-engine inoperative (OEI) 30 s supercontingency rating for rotorcraft, and this value may vary as a function of the duration for which this supercontingency rating is acceptable.

It should be observed that the limit advance speed threshold and the limit vertical speed threshold determined during the preliminary step correspond to a static vortex domain, with the attitude of the plane of the main rotor of the rotorcraft then being considered as being substantially zero. Consequently, comparing the predictive advance speed $V_{AP}$ with the limit advance speed threshold and comparing the predictive vertical speed $V_{ZP}$ with the limit vertical speed threshold make it possible to detect approaching a static vortex domain, the attitude of the plane of the main rotor of the rotorcraft being substantially zero.

In contrast, during a flight, a rotorcraft often flies with a plane of the main rotor that is inclined, in particular when the aircraft is in a stage of deceleration. Consequently, the longitudinal attitude θ of the rotorcraft is not zero, the longitudinal direction X of the rotorcraft being inclined at an attitude angle θ relative to a horizontal plane. Under such circumstances, the rotorcraft may be approaching a dynamic vortex domain.

In the context of the invention, it can be assumed that the angle formed by the plane of the main rotor of the rotorcraft relative to a horizontal plane is identical to the angle formed by the attitude of the rotorcraft relative to a horizontal plane.

In reality, the pilot of the rotorcraft begins by causing the plane of the main rotor of the rotorcraft to be tilted, thereby leading to the attitude of the rotorcraft changing, which attitude stabilizes on an attitude angle that is substantially equal to the angle of the plane of the main rotor of the rotorcraft relative to a horizontal plane. Thus, the angle θ formed by the plane of the main rotor of the rotorcraft relative to a horizontal plane and the attitude angle of the rotorcraft relative to the horizontal plane are substantially identical at the end of the maneuver, but they differ during a transient period while the maneuver is being performed.

This approximation is possible firstly because the difference between the attitude of the plane of the main rotor and the longitudinal attitude θ of the rotorcraft is small and/or transient, and secondly because the method of the invention serves to detect an approach to a vortex domain over a prediction time interval Δt.

Advantageously, the diagram for the static vortex domain as determined during the preliminary step is also suitable for detecting an approach to a dynamic vortex domain. Specifically by changing the coordinate axes, where rotating the coordinate axes formed by the instantaneous advance speed and the instantaneous vertical speed $V_A$ and $V_Z$ through the attitude angle θ serves to transpose from a static vortex domain to a dynamic vortex domain.

Nevertheless, when the advance speed $V_A$ of the rotorcraft is equal to the proper speed $V_P$ or is well approximated by the calibrated airspeed $V_C$, the predictive advance speed $V_{AP}$ lies in the plane of the main rotor both for a static vortex domain and for a dynamic vortex domain.

Consequently, during the step of triggering an alarm, the predictive vertical speed $V_{ZP}$ that is compared with the limit vertical speed threshold is replaced by the formula ($V_{ZP}$·cos θ). This formula thus corresponds to a change of coordinate axes so as to go from a dynamic vortex reference frame to the static vortex reference frame as determined in the preliminary step.

Thus, regardless of the variant that is used, the method of the invention for detecting and signaling that a rotorcraft is approaching a vortex domain thus enables an alarm to be triggered when the rotorcraft is approaching a vortex domain of static type, i.e. for an attitude angle θ of the rotorcraft that is substantially zero, or indeed a vortex domain of dynamic type, i.e. for an attitude angle θ of the rotorcraft that is not zero.

In addition, the method of the invention may also serve to determine whether the rotorcraft is in a vortex domain at the current instant t. For this purpose, during the calculation step, the predictive advance speed $V_{AP}$ is replaced by the instantaneous advance speed $V_A$ of the rotorcraft and the predictive vertical speed $V_{ZP}$ is replaced by the instantaneous vertical speed $V_Z$ of the rotorcraft.

The invention also provides a device for detecting that a rotorcraft is approaching a vortex domain, the rotorcraft forming part of a rotorcraft family. The rotorcraft has a main rotor with blades and the device for detecting the approach to a vortex domain comprises:

first measurement means for measuring an instantaneous vertical speed $V_Z$ of the rotorcraft;

second measurement means for measuring a calibrated airspeed $V_C$ of the rotorcraft;

memory means containing a limit advance speed threshold and a limit vertical speed threshold defining a limit for entering into a vortex domain for the rotorcraft family of the rotorcraft;

calculation means connected to the first and second measurement means and to the memory means, the calculation means being for detecting that the rotorcraft is approaching a vortex domain; and signaling means for signaling that the rotorcraft is approaching a vortex domain, the signaling means being connected to the calculation means.

By way of example, the first measurement means may be a vertical speed indicator and the second measurement means may be an airspeed indicator. The memory means may comprise a memory containing a database including the limit advance speed threshold and a limit vertical speed threshold together with various relationships making it possible to calculate an instantaneous advance speed $V_A$, an instantaneous advance acceleration $$\frac{dV_A}{dt},$$

an instantaneous vertical acceleration $$\frac{dV_Z}{dt},$$

predictive speeds, and making it possible to detect that the rotorcraft is approaching a vortex domain. By way of example, the calculation means may be a computer and the signaling means may be an indicator lamp or an information screen on which a message is displayed signaling the alarm.

The device makes use of the above-described method of detecting that a rotorcraft is approaching a vortex domain for the purpose of determining whether the rotorcraft is close to entering into a vortex domain.

BRIEF DESCRIPTION OF THE DRAWINGS

The invention and its advantages appear in greater detail from the context of the following description showing preferred embodiments that are given without any limiting character and with reference to the accompanying figures, in which:

FIGS. 1 and 2 are two views of a rotorcraft;

FIG. 3 shows the flow of air in the presence of a main rotor of a rotorcraft in a vortex domain;

FIG. 4 shows a device for detecting the approach of a vortex domain by a rotorcraft of the invention;

FIG. 5 is a block diagram of a method of detecting the approach of a vortex domain being detected by a rotorcraft;

FIGS. 6 and 7 are two diagrams showing a vortex domain; and

FIG. 8 is a simplified diagram showing a vortex domain.

Elements present in more than one of the figures are given the same references in each of them.

DETAILED DESCRIPTION OF THE INVENTION

In FIGS. 1 and 2, a rotorcraft 20 has a main rotor 21 provided with blades 22 rotating about an axis 25. A rectangular reference frame (X, Y, Z) is associated with the rotorcraft 20. This reference frame (X, Y, Z) is defined by a longitudinal direction X extending from the rear of the rotorcraft 20 towards the front of the rotorcraft 20, a direction in elevation Z extending upwards perpendicularly to the longitudinal direction X, and a transverse direction Y extending from right to left perpendicularly to the longitudinal and elevation directions X and Z. The axis 25 of the main rotor 21 is substantially parallel to the elevation direction Z.

In FIGS. 1 and 2, a terrestrial reference frame $(X_t, Y_t, Z_t)$ is also shown. This terrestrial reference frame $(X_t, Y_t, Z_t)$ is defined by a direction $Z_t$ parallel to the gravity direction and two directions $X_t$ and $Y_t$ defining a horizontal plane $P_h$ perpendicular to the vertical direction $Z_t$.

In FIG. 1, it can be seen that the elevation direction Z associated with the rotorcraft 20 is parallel to the vertical direction $Z_t$. The plane $P_R$ formed by the main rotor 21 is parallel to the horizontal plane $P_h$, since the rotorcraft 20 is flying with an attitude angle θ of zero. In FIG. 2, the plane $P_R$ forms an angle θ with the horizontal plane $P_h$, and the rotorcraft 20 is then flying with an attitude angle θ. The elevation direction Z associated with the rotorcraft 20 also forms an angle equal to the attitude angle θ with the vertical direction $Z_t$ of the terrestrial reference frame $(X_t, Y_t, Z_t)$.

FIG. 3 shows the main rotor 21 operating in a static vortex domain. The rotor plane $P_R$ formed by the main rotor 21 is parallel to the horizontal plane $P_h$ and thus perpendicular to the gravity direction. The air flow speed directions shown in FIG. 3 correspond to the rotorcraft 20 descending slowly and practically vertically.

The speed $V_V$ designates the vertical component of the upstream speed of the air flow, normal to the plane $P_R$ formed by the main rotor 21, and in this situation the value $V_F$, referred to by the person skilled in the art as the "Froude speed", is greater than the speed $V_V$. It can be seen that a wake S forms at the bottom portion of the main rotor 21, thereby obliging the top central air streams FCS to create a turbulent zone ZT towards the periphery of the blades 22.

Under such conditions, a vortex state phenomenon manifested in principle by vibrations perceived by the crew of the rotorcraft 20 arises when the rotorcraft 20 begins descending purely vertically or with a steep descent angle, since the main rotor 21 is then descending through its own downwash and losing lift because it is isolated from the air flow. As a result, the rotorcraft 20 will drop suddenly, unless a correcting maneuver is undertaken by the pilot of the rotorcraft 20.

In order to remedy this dangerous situation specific to the rotorcraft, the rotorcraft 20 may include a device for detecting and signaling that a rotorcraft 20 is approaching a vortex domain. This device 20 serves to enable the rotorcraft 20 to perform a method of detecting the approach of a vortex domain and of signaling that detection, which method is summarized diagrammatically in FIG. 5.

The device 10 can then detect the approach of a vortex domain and signal that detection to the pilot of the rotorcraft 20 by way of prediction. Under such circumstances, the pilot can take the necessary measures by taking anticipatory action in the light of this approach, so as to avoid the rotorcraft 20 entering into this vortex domain.

The device 10 is shown in FIG. 4 and comprises:

first measurement means 1 for measuring the instantaneous vertical speed $V_Z$ of the rotorcraft 20;

second measurement means 2 for measuring the calibrated airspeed $V_C$ of the rotorcraft 20;

memory means 3 for storing a limit advance speed threshold and a limit vertical speed threshold defining a limit for entering into a vortex domain for the rotorcraft family of the rotorcraft 20, and also various relationships needed for performing the method;

calculation means 4 connected to the first and second measurement means 1 and 2 and to the memory means 3, in order to apply these relationships and detect that the rotorcraft 20 is approaching a vortex domain;

signaling means 5 for signaling to the pilot of the rotorcraft 20 that the rotorcraft 20 is approaching a vortex domain, the signaling means 5 being connected to the calculation means 4;

third measurement means 6 connected to the calculation means 4 to measure the longitudinal attitude θ of the rotorcraft 20; and fourth measurement means 7 connected to the calculation means 4 for measuring an instantaneous advance acceleration $$\frac{dV_A}{dt}$$

and an instantaneous vertical acceleration $$\frac{dV_Z}{dt}$$

of the rotorcraft 20.

By way of example, the first measurement means 1 is a vertical speed indicator and the second speed measurement means 2 is an airspeed indicator. The memory means 3 may be a memory containing in particular a database with the limit advance speed threshold and the limit vertical speed threshold and also characteristics of the rotorcraft family of the rotorcraft 20. The memory means 3 contain the various relationships used by the calculation means 4. By way of example, the calculation means 4 may be a computer and the signaling means 5 an indicator lamp situated on the instrument panel of the rotorcraft 20. By way of rotorcraft, the third measurement means 6 may be an artificial horizon instrument and the fourth measurement means 7 may be an accelerometer. The third and fourth measurement means 6 and 7 may also be grouped together within a single device known as an attitude and heading reference system (AHRS) that supplies the accelerations and the attitude angles of the rotorcraft relative to the three axes of the reference frame (X, Y, Z).

Nevertheless, the instantaneous advance acceleration and vertical acceleration may be determined by the calculation means 4 by taking the derivative with respect to time of the instantaneous advance speed and vertical speed $V_A$ and $V_Z$. The device 10 then does not have the fourth measurement means 7.

The method of detecting that a rotorcraft 20 is approaching a vortex domain and signaling this detection comprises four main steps, as shown in FIG. 5.

Firstly, during a preliminary step (a), a series of speed measurements is performed on a reference rotorcraft during preliminary test flights in order to determine a limit advance speed threshold and a limit vertical speed threshold. These preliminary test flights are performed at the limit of vortex domains and until entering into such vortex domains. These preliminary test flights thus make it possible firstly to determine a diagram showing a mean shape of a static vortex for the reference rotorcraft, and consequently for all of the rotorcraft 20 in the family of rotorcraft in which this reference rotorcraft forms a part.

Such diagrams are shown in FIGS. 6 and 7 in a coordinate system formed by the instantaneous advance speed $V_A$ of the rotorcraft 20 plotted along the abscissa axis and its instantaneous vertical speed $V_Z$ plotted up the ordinate axis. On the basis of each diagram, limit advance speed and limit vertical speed thresholds can be determined, the limit advance speed threshold and the limit vertical speed threshold thus defining a limit for entering into a vortex domain for all of the rotorcraft 20 in the rotorcraft family to which the diagram corresponds.

In a first variant of the invention corresponding to the diagram of FIG. 6, the limit advance speed threshold and the limit vertical speed threshold are formed respectively by thresholds that are simple and constant, i.e. a limit advance speed $V_{AL}$ and a limit vertical speed $V_{ZL}$.

The limit advance speed $V_{AL}$ is less than a first upper limit $L_A$ for advance speed of the vortex domain. Likewise, the limit vertical speed $V_{ZL}$, which is equal to half the mean value of the induced speed Vi of the main rotor 21 when hovering outside the ground effect zone, is less than a second upper limit $L_Z$ for vertical speed of the vortex domain.

In a second variant of the invention, corresponding to the diagram of FIG. 7, the limit advance speed threshold and the limit vertical speed threshold are formed respectively by first and second thresholds having hysteresis. Thus, the limit advance speed threshold is constituted by a first limit advance speed $V_{AL1}$ and a second limit advance speed $V_{AL2}$. The first limit advance speed $V_{AL1}$ is less than the first upper limit $L_A$ and less than the second limit advance speed $V_{AL2}$, while the second limit advance speed $V_{AL2}$ is greater than the first upper limit $L_A$.

Likewise, the limit vertical speed threshold is constituted by a first limit vertical speed $V_{ZL1}$ and a second limit vertical speed $V_{ZL2}$. The first limit vertical speed $V_{ZL1}$, which is equal to half the mean value of the induced speed Vi of the main rotor 21 when hovering outside the ground effect zone, is less than the second upper limit $L_Z$ and less than the second limit vertical speed $V_{ZL2}$, whereas the second limit vertical speed $V_{ZL2}$ is greater than the second upper limit $L_Z$.

These limit advance and vertical speeds are determined as a result of preliminary tests performed on the reference rotorcraft of the rotorcraft family.

In addition, in a third variant of the invention, the limit advance speed threshold and the limit vertical speed threshold may also be formed by the top curve of the vortex domain as determined as a result of preliminary test flights on the reference rotorcraft of the rotorcraft family. These limit advance speed and limit vertical speed thresholds are thus variable.

Thereafter, during a calculation step (b), a predictive advance speed $V_{AP}$ and a predictive vertical speed $V_{ZP}$ are determined for the rotorcraft 20 in real time during a flight of the rotorcraft 20. This calculation step (b) is made up of substeps.

During a determination substep (b1), the instantaneous vertical speed $V_Z$ of the rotorcraft 20 is measured by the measurement means 1 in the terrestrial reference frame ($X_t$, $Y_t$, $Z_t$), i.e. relative to the gravity direction.

During this determination substep (b1), the calibrated airspeed $V_C$, which corresponds to the speed of the rotorcraft 20 relative to air, is also measured by the second measurement means 2 in the reference frame (X, Y, Z) associated with the invention 20.

This measurement of the calibrated airspeed $V_C$ may be along the longitudinal direction X of the rotorcraft 20 if the second measurement means 2 is a single-direction airspeed indicator aligned on the longitudinal direction X, for example.

This measurement of the calibrated airspeed $V_C$ may also be situated in a plane formed by the longitudinal and transverse directions X and Y of the rotorcraft 20 when the second measurement means 2 is a two-directional airspeed indicator, such as an ultrasound airspeed indicator.

This measurement of the calibrated airspeed $V_C$ may also be represented by a vector relative to all three directions of the reference frame (X, Y, Z) associated with the rotorcraft 20, when the second measurement means 2 is a three-directional airspeed indicator such as a LIDAR airspeed indicator.

Thereafter, the calculation means 4 determine the instantaneous advance speed $V_A$ on the basis of this measurement of the calibrated airspeed $V_C$, in particular by applying a barometric correction.

The instantaneous advance speed $V_A$ may be associated with the calibrated airspeed $V_C$ by the relationship $Vc = V_A \cdot \sqrt{\sigma}$, and may thus be constituted by the instantaneous proper speed $V_P$ of the rotorcraft 20. The predictive advance speed $V_{AP}$ then constitutes a predictive proper speed $V_{PP}$ of the rotorcraft 20.

The instantaneous advance speed $V_A$ may also be approximated by a horizontal component of the instantaneous proper speed $V_P$ of the rotorcraft 20, i.e. a projection onto a horizontal plane of the calibrated airspeed $V_C$ of the rotorcraft as barometrically corrected. The predictive advance speed $V_{AP}$ then constitutes a horizontal component of the predictive proper speed of the rotorcraft 20.

Thereafter, during a first calculation substep (b2), the predictive advance speed $V_{AP}$ is calculated using a first relationship:

$$V_{AP} = V_A + \Delta t \cdot \frac{dV_A}{dt}$$

where t and $\Delta t$ designate respectively time and the prediction time interval, $$\frac{dV_A}{dt}$$

being the instantaneous advance acceleration of the rotorcraft 20.

During a second calculation substep (b3), the predictive vertical speed $V_{ZP}$ is calculated on the basis of knowing the instantaneous advance speed $V_A$.

If the instantaneous advance speed $V_A$ is greater than an upper limit speed, then the predictive vertical speed $V_{ZP}$ is calculated by a second relationship:

$$V_{ZP} = V_Z + A \cdot \left| V_A \cdot \frac{dV_A}{dt} \right| + B \cdot (V_Z + k) \cdot \frac{V_{AP} - V_A}{2 \cdot V_Y - V_{AP}}$$

where:

k is a constant that is characteristic of the rotorcraft family of the rotorcraft 20, A is a first weighting coefficient, B is a second weighting coefficient, and $V_Y$ is a predetermined minimum power speed of the family of the rotorcraft 20. Specifically, the expression $$B \cdot (V_Z + k) \cdot \frac{V_{AP} - V_A}{2 \cdot V_Y - V_{AP}}$$

is applicable for calculating the predictive vertical speed $V_{ZP}$ only when the rotorcraft 20 is flying firstly with an instantaneous advance speed $V_A$ less than the predetermined minimum power speed $V_Y$ of the family of the rotorcraft 20, and greater than the upper limit speed, and secondly with an instantaneous advance speed $V_A$ that is decreasing, characteristic of the rotorcraft 20 decelerating.

If the instantaneous advance speed $V_A$ is less than a lower limit speed, the predictive vertical speed $V_{ZP}$ is calculated by a third relationship:

$$V_{ZP} = V_Z + D \cdot \Delta t \cdot \frac{dV_Z}{dt}$$

where D is a third weighting coefficient, and $$\frac{dV_Z}{dt}$$

is an instantaneous vertical acceleration of the rotorcraft 20.

Finally, if the instantaneous advance speed $V_A$ is less than or equal to the upper limit speed and greater than or equal to the lower limit speed, then the predictive vertical speed $V_{ZP}$ is an interpolation, e.g. a linear interpolation, between the second and third relationships.

Nevertheless, in another alternative, the predictive vertical speed $V_{ZP}$ may be calculated using logic with hysteresis. As a result, the second relationship is also applied while the instantaneous advance speed $V_A$ is decreasing from the upper limit speed and is greater than or equal to the lower limit speed. Likewise, the third relationship is applied when the instantaneous advance speed $V_A$ is increasing from the lower limit speed and remains less than or equal to the upper limit speed.

Thereafter, during a triggering step (c), the predictive advance speed $V_{AP}$ and the predictive vertical speed $V_{ZP}$ are compared respectively and simultaneously with the limit advance speed threshold and with the limit vertical speed threshold, and an alarm is triggered to the effect that the rotorcraft 20 is approaching a vortex domain when firstly the predictive advance speed $V_{AP}$ has reached the limit advance speed threshold and secondly the predictive vertical speed $V_{ZP}$ has reached the limit vertical speed threshold.

In the first variant of the invention, the alarm is triggered when firstly the predictive advance speed $V_{AP}$ is less than or equal to the limit advance speed and secondly the predictive vertical speed $V_{ZP}$ is less than or equal to the limit vertical speed. By way of example, the alarm is triggered for the first predictive operating point $P_1$ characterized by a first predictive advance speed $V_{AP1}$ less than the limit advance speed $V_{AL}$ and a first predictive vertical speed $V_{ZP1}$ less than the limit vertical speed $V_{ZL}$, this first predictive operating point $P_1$ being situated below the limit advance speed $V_{AL}$ and of the left of the limit vertical speed $V_{ZL}$ in FIG. 6.

The alarm is then deactivated as soon as the predictive advance speed $V_{AP}$ is greater than the limit advance speed or as soon as the predictive vertical speed $V_{ZP}$ is greater than the limit vertical speed. By way of example, the alarm is deactivated for the second predictive operating point $P_2$ characterized by a second predictive advance speed $V_{AP2}$ greater than the limit advance speed $V_{AL}$ and a second predictive vertical speed $V_{ZP2}$, still less than the limit vertical speed $V_{ZL}$.

After applying this method of detecting the approach of a vortex domain with a prediction time $\Delta t$ of 10 seconds, and of signaling such a detection, the diagram shown in FIG. 6 can be simplified as shown in the simplified diagram of FIG. 8. In particular, the bottom zone of the vortex domain in FIG. 6 is not taken into consideration since this region of the flight envelope is not operationally useful, and can therefore be omitted from the simplified diagram. This bottom zone of the vortex domain corresponds in particular to a vertical descent speed of more than 3000 ft/min. Specifically, during rapid descent, the rotorcraft is traveling at high horizontal speeds and in any event at speeds greater than the minimum power speed $V_Y$.

Furthermore, the upper zone of the vortex domain can also be simplified by using the limit advance speed $V_{AL}$ and the limit vertical speed $V_{ZL}$ directly, as shown in FIG. 8.

In a second variant of the invention, the alarm is triggered when firstly the predictive advance speed $V_{AP}$ is less than or equal to the first limit advance speed $V_{AL1}$ and secondly the predictive vertical speed $V_{ZP}$ is less than or equal to the first limit vertical speed $V_{ZL1}$. By way of example, the alarm is triggered for the first predictive operating point $P_1$ characterized by a first predictive advance speed $V_{AP1}$ less than the first limit advance speed $V_{AL1}$ and a first predictive vertical speed $V_{ZP1}$ less than the first limit vertical speed $V_{ZL1}$, this first predictive operating point $P_1$ being situated below the first limit advance speed $V_{AL1}$ and to the left of the first limit vertical speed $V_{ZL1}$ in FIG. 7.

The alarm is then deactivated as soon as the predictive advance speed $V_{AP}$ is greater than the second limit advance speed or as soon as the predictive vertical speed $V_{ZP}$ is greater than the second limit vertical speed. By way of example, the alarm is deactivated for the third predictive operating point $P_3$ characterized by a third predictive advance speed $V_{AP3}$ greater than the second limit advance speed $V_{AL2}$ and a third predictive vertical speed $Z_{ZP3}$ still less than the first limit vertical speed $V_{ZL1}$.

In contrast, the alarm is not deactivated for the second predictive operating point $P_2$ characterized by a second predictive advance speed $V_{AP2}$ greater than the first limit advance speed $V_{AL1}$ but less than the second limit advance speed $V_{AL2}$ and a second predictive vertical speed $V_{ZP2}$ less than the first limit vertical speed $V_{ZL1}$.

It should be observed that for both of these variants, a predictive operating point of the rotorcraft 20 may be situated in the vortex domain, even though it is situated below a first limit speed and above a second limit speed, e.g. in the zones B and C in FIGS. 6 and 7. For example, an operating point situated in the zone B is situated below the limit advance speed and above the limit vertical speed. If the pilot of the rotorcraft 20 does not take action, the predictive operating point will continue to lie in the vortex domain and will reach the second limit speed. The alarm that the approach of a vortex domain has been detected is then triggered and corresponds to a new prediction time interval that is less than the prediction time interval Δt. Advantageously, the alarm is nevertheless triggered and corresponds to detecting this approach to the vortex domain with a smaller prediction time interval.

Likewise, a predictive operating point of the rotorcraft 20 may lie outside the vortex domain, even though it is situated below both limit speeds, e.g. for the zone D in FIGS. 6 and 7. Under such circumstances, the alarm is triggered even before the predictive operating point enters into the vortex domain, but the rotorcraft 20 nevertheless has a flight path that appears to be heading towards the vortex domain. The alarm is thus triggered for detecting an approach to the vortex domain with a prediction time interval that is increased.

The positions of the limit speed thresholds thus make it possible to find a compromise between the dimensions firstly to the zones B and C and secondly of the zone D, and consequently to limit the variations in the prediction time interval for detecting an approach to the vortex domain. Furthermore, the value of the prediction time interval Δt advantageously enables these variations in the prediction time interval to remain acceptable so that the alarm is triggered soon enough to enable the pilot to carry out the necessary maneuver for avoiding actually entering this vortex domain.

The invention sets out to detect an approach to a vortex domain over a prediction time interval Δt, and the approximation associated with these positions for the limit speed thresholds thus mainly impacts the prediction time interval, but without generating a risk of not detecting the approach of a vortex domain or the risk of triggering false alarms.

Finally, during a signaling step (d), the detection of an approach to the vortex domain is signaled to a pilot of the rotorcraft 20 as a result of the alarm being triggered. This alarm may be signaled visually to the pilot, by lightning an indicator lamp 5.

In addition, during this signaling step, time delays may be used between triggering the alarm and signaling this triggering to the pilot of the rotorcraft 20 and also between deactivating the alarm and signaling this deactivation to the pilot.

Comparing the predictive advance and vertical speeds $V_{AP}$ and $V_{ZP}$ directly and respectively with the limit advance and vertical speeds corresponds to detecting an approach to a static vortex domain, while the plane of the main rotor and the longitudinal attitude θ of the rotorcraft are considered to be substantially zero.

Nevertheless, a rotorcraft frequently operates in flight with its main rotor occupying a plane that is inclined, in particular while the rotorcraft is decelerating. Consequently, the longitudinal direction X of the rotorcraft is inclined with an attitude angle θ relative to a horizontal plane. Under such circumstances, the rotorcraft may be approaching a dynamic vortex domain.

Advantageously, the diagrams representing the static vortex domain as shown in FIGS. 6, 7, and 8 are also appropriate for detecting an approach to a dynamic vortex domain. Specifically, a change of reference frame by applying a rotation to the reference frame formed by the instantaneous advance and vertical speeds $V_A$ and $V_Z$ through the attitude angle θ, as shown in FIG. 6, advantageously makes it possible to use the same vortex representation regardless of whether the rotorcraft is approaching a static vortex or a dynamic vortex.

Thus, when said longitudinal direction X is inclined at an attitude angle θ relative to the horizontal plane, the predictive vertical speed $V_{ZP}$ that is compared with the limit vertical speed is replaced by the formula ($V_{ZP}\cdot\cos\theta$).

This change of reference frame is applied solely to the predictive vertical speed $V_{ZP}$. Specifically, when the advance speed $V_A$ of the rotorcraft is equal to the proper speed $V_P$, the predictive advance speed $V_{AP}$ is situated in the plane of the main rotor 21 both for the static vortex domain and for the dynamic vortex domain.

The method of the invention thus makes it possible to detect equally well an approach to a static vortex domain and an approach to a dynamic vortex domain depending on the attitude angle θ of the rotorcraft.

Naturally, the present invention may be subjected to numerous variations as to its implementation. Although several implementations are described, it will readily be understood that it is not conceivable to identify exhaustively all possible implementations. It is naturally possible to envisage replacing any of the means described by equivalent means without going beyond the ambit of the present invention.

What is claimed is:

1. A method of detecting that a rotorcraft is approaching a vortex domain, and of signaling that detection, the rotorcraft forming part of a rotorcraft family and having a main rotor with blades, wherein the method comprises the following steps:

a) a preliminary step of determining a limit advance speed threshold and a limit vertical speed threshold defining a limit for entering into a vortex domain for the family of rotorcraft;

b) a calculation step of calculating in real time a predictive advance speed and a predictive vertical speed of the rotorcraft during a flight of the rotorcraft;

the predictive advance speed being calculated as a function of an instantaneous advance speed and of an instantaneous advance acceleration of the rotorcraft over a prediction time interval Δt characterizing the prediction time of the predictive advance speed and of the predictive vertical speed; and the predictive vertical speed being calculated on the basis of the instantaneous advance speed, when the instantaneous advance speed is greater than an upper limit speed, the predictive vertical speed being calculated as a function of the instantaneous vertical speed of the rotorcraft, of the energy balance of the rotorcraft, and of the power variation needed by the main rotor for level flight over the prediction time interval; and when the instantaneous advance speed is less than a lower limit speed, the predictive vertical speed being calculated as a function of the instantaneous vertical speed and of an instantaneous vertical acceleration of the rotorcraft;

c) a step of triggering an alarm that a rotorcraft is approaching a vortex domain, the predictive advance speed and the predictive vertical speed being compared respectively with the limit advance speed threshold and with the limit vertical speed threshold, the alarm being triggered when firstly the predictive advance speed has reached the limit advance speed threshold, and secondly the predictive vertical speed has reached the limit vertical speed threshold; and d) a step of signaling the alarm to a pilot of the rotorcraft as a result of the triggering of the alarm.

2. A method according to claim 1, wherein when the instantaneous advance speed is less than or equal to the upper limit speed and greater than or equal to the lower limit speed, the predictive vertical speed is an interpolation between the above two situations, i.e. when the instantaneous advance speed is greater than the upper limit speed or when the instantaneous advance speed is less than the lower limit speed.

3. A method according to claim 1, wherein when the instantaneous advance speed is less than or equal to the upper limit speed and greater than or equal to the lower limit speed, the predictive vertical speed is calculated using logic with hysteresis between the two above situations, i.e. that when the instantaneous advance speed decreases from the upper limit speed and remains greater than or equal to the lower limit speed, the predictive vertical speed is calculated using the first situation, i.e. as a function of the instantaneous vertical speed, of the energy balance of the rotorcraft, and of the variation in the power needed by the main rotor for level flight over the prediction time interval, and when the instantaneous advance speed increases from the lower limit speed and remains less than or equal to the upper limit speed, the predictive vertical speed is calculated using the second situation, i.e. as a function of the instantaneous vertical speed and of the instantaneous vertical acceleration of the rotorcraft.

4. A method according to claim 1, wherein the calculation step comprises substeps:

b1) a substep of determining the instantaneous advance speed and the instantaneous vertical speed of the rotorcraft;

b2) a first calculation substep of calculating the predictive advance speed using a first relationship:

$$V_{AP} = V_A + \Delta t \cdot \frac{dV_A}{dt}$$

where t and Δt designate respectively time and the prediction time interval, being an instantaneous advance acceleration of the rotorcraft;

b3) a second calculation substep of calculating the predictive vertical speed on the basis of the instantaneous forward speed, when the instantaneous advance speed is greater than the upper limit speed, the predictive vertical speed is calculated using a second relationship:

$$V_{ZP} = V_Z + A \cdot \left| V_A \cdot \frac{dV_A}{dt} \right| + B \cdot (V_Z + k) \cdot \frac{V_{AP} - V_A}{2 \cdot V_Y - V_{AP}}$$

where k is a constant characteristic of the rotorcraft family of the rotorcraft, A is a first weighting coefficient, B is a second weighting coefficient, and $V_y$ is a predetermined minimum power speed of the family of the rotorcraft, the expression:

$$B \cdot (V_Z + k) \cdot \frac{V_{AP} - V_A}{2 \cdot V_Y - V_{AP}}$$

being applicable for calculating the predictive vertical speed only when the rotorcraft is flying firstly with a low instantaneous advance speed less than the predetermined minimum power speed of the family of the rotorcraft, but still greater than the upper limit speed, and secondly with an instantaneous advance speed that is decreasing, characterizing deceleration of the rotorcraft; and when the instantaneous advance speed is less than the lower limit speed, the predictive vertical speed is calculated by a third relationship:

$$V_{ZP} = V_Z + D \cdot \Delta t \cdot \frac{dV_Z}{dt}$$

where D is a third weighting coefficient, and is an instantaneous vertical acceleration of the rotorcraft.

5. A method according to claim 4, wherein the characteristic constant k is equal to 4000 ft/min, the first weighting coefficient A is equal to −0.05, the second weighting coefficient B is equal to 1 when $V_A \leq V_y$, and zero when $V_A > V_y$, and the third weighting coefficient D is equal to 0.5.

6. A method according to claim 1, wherein the limit advance speed threshold and the limit vertical speed threshold are constituted by a curve for the vortex domain in a diagram where the abscissa and ordinate axes correspond respectively to the instantaneous advance speed and the instantaneous vertical speed of the rotorcraft, the curve for the vortex domain being representative of a vortex state of the family of the rotorcraft and being determined as a result of prior measurements in flight on a reference rotorcraft of the family of rotorcraft, and during the step of triggering an alarm, the alarm is triggered when the predictive advance speed and the predictive vertical speed form a predictive operating point for the rotorcraft that is situated on or below the curve for the vortex domain, the alarm being deactivated as soon as the predictive advance speed and the predictive vertical speed form a predictive operating point that is situated above the curve for the vortex domain.

7. A method according to claim 1, wherein the limit advance speed threshold is constituted by a limit advance speed and the limit vertical speed threshold is constituted by a limit vertical speed, and during the step of triggering an alarm, the alarm is triggered when firstly the predictive advance speed is less than or equal to the limit advance speed and secondly the predictive vertical speed is less than or equal to the limit vertical speed, the alarm being deactivated as soon as the predictive advance speed is greater than the limit advance speed or the predictive vertical speed is greater than the limit vertical speed.

8. A method according to claim 7, wherein the limit vertical speed corresponds to half a mean value of an induced speed of the main rotor when the rotorcraft is hovering outside a ground effect zone.

9. A method according to claim 7, wherein the limit advance speed is equal to 25 kt and the limit vertical speed is equal to 1200 ft/min oriented in the downward direction.

10. A method according to claim 1, wherein the advance speed threshold is a first threshold with hysteresis constituted by a first limit advance speed and a second limit advance speed, the first limit advance speed being less than the second limit advance speed, the limit vertical speed threshold is a second threshold with hysteresis constituted by a first limit vertical speed and by a second limit vertical speed, the first limit vertical speed being less than the second limit vertical speed, and during the step of triggering an alarm of a rotorcraft approaching a vortex domain, the alarm is triggered when firstly the predictive advance speed is less than or equal to the first limit advance speed and secondly the predictive vertical speed is less than or equal to the first limit vertical speed, the alarm being deactivated as soon as the predictive advance speed is greater than the second limit advance speed or the predictive vertical speed is greater than the second limit vertical speed.

11. A method according to claim 10, wherein one of the first and second limit vertical speeds corresponds to half a mean value of the induced speed of the main rotor when the rotorcraft is hovering outside a ground effect zone.

12. A method according to claim 10, wherein the first limit advance speed is equal to 21 kt, the second limit advance speed is equal to 26 kt, the first limit vertical speed is equal to 800 ft/min oriented in the downward direction, and the second limit vertical speed is equal to 1200 ft/min oriented in the downward direction.

13. A method according to claim 1, wherein the lower limit speed is equal to 15 kt and the upper limit speed is equal to 35 kt.

14. A method according to claim 1, wherein the method includes an alarm inhibit step of deactivating the signaling of the alarm to the pilot of the rotorcraft when the rotorcraft is flying at a height relative to the ground that is less than or equal to a limit height or when the rotorcraft have at least two engines and has entered into an emergency mode of operation as a result of a malfunction of one of the engines for a duration less than a predetermined duration.

15. A method according to claim 14, wherein the limit height lies in the range 20 ft to 100 ft and the predetermined duration is equal to 30 s.

16. A method according to claim 1, wherein the during the signaling step time delays are used between the triggering of the alarm and the signaling to the pilot of the rotorcraft that the alarm has been triggered, and also between deactivating the alarm and the signaling to the pilot of the deactivation of the alarm.

17. A method according to claim 1, wherein the rotorcraft is characterized by three leading directions, a longitudinal direction X extending from the rear of the rotorcraft towards the front of the rotorcraft, an elevation direction Z extending upwards perpendicularly to the longitudinal direction X, and a transverse direction Y extending from right to left perpendicularly to the longitudinal and elevation directions X and Z, and when the longitudinal direction X is inclined at an angle θ relative to a horizontal plane, the predictive vertical speed is replaced by a formula ($V_{zp}.\cos θ$), which is compared with the limit vertical speed threshold.

18. A method according to claim 1, wherein during the calculation step, the predictive advance speed is equal to the instantaneous advance speed of the rotorcraft and the predictive vertical speed is equal to the instantaneous vertical speed of the rotorcraft in order to determine during the step of triggering an alarm whether the rotorcraft is in a vortex domain at the current instant t.

19. A method according to claim 1, wherein the instantaneous advance speed and the predictive advance speed of the rotorcraft are formed respectively by an instantaneous proper speed and a predictive proper speed of the rotorcraft.

20. A method according to claim 1, wherein the instantaneous advance speed and the predictive advance speed of the rotorcraft are formed respectively by a horizontal component of an instantaneous proper speed and by a horizontal component of a predictive proper speed of the rotorcraft.

21. A device for detecting and signaling that a rotorcraft is approaching a vortex domain, the rotorcraft belonging to a family of rotorcraft, the rotorcraft including a main rotor having blades, the device comprising:

first measurement means for measuring an instantaneous vertical speed ($V_Z$) of the rotorcraft;

second measurement means for measuring a calibrated airspeed of the rotorcraft;

memory means containing a limit advance speed threshold and a limit vertical speed threshold defining a limit for entering into a vortex domain for the rotorcraft family of the rotorcraft;

calculation means connected to the first and second measurement means and to the memory means, the calculation means being for calculating an instantaneous advance speed, an instantaneous vertical acceleration and an instantaneous advance acceleration of the rotorcraft and for detecting that the rotorcraft is approaching a vortex domain; and signaling means for signaling that the rotorcraft is approaching a vortex domain, the signaling means being connected to the calculation means;

wherein the device performs the method according to claim 1.

\* \* \* \* \*